Nov. 16, 1943.                 T. A. RICH                   2,334,584
                    METHOD OF MAKING ELECTRIC COILS
                         Filed May 19, 1942

Inventor:
Theodore A. Rich,
by Harry E. Dunham
    His Attorney.

Patented Nov. 16, 1943

2,334,584

UNITED STATES PATENT OFFICE 2,334,584

METHOD OF MAKING ELECTRIC COILS

Theodore A. Rich, Schenectady, N. Y., assignor to General Electric Company, a corporation of New York Application May 19, 1942, Serial No. 443,672

4 Claims. (Cl. 29—155.5)

My invention relates to a method of making electrically insulated coils particularly flat spirally wound coils suitable for use in certain electrical measuring instruments.

The object of my invention is to provide coils of the character described at low expense and coils which are well insulated, self-supporting and free from objectionable metallic parts heretofore employed in the formation of such coils.

Figure 1:
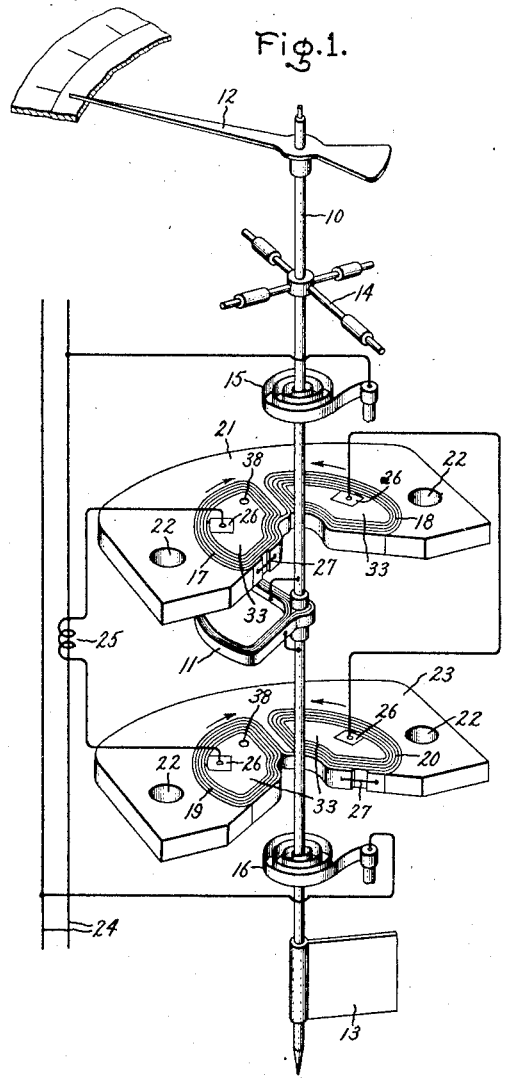
Figure 2:
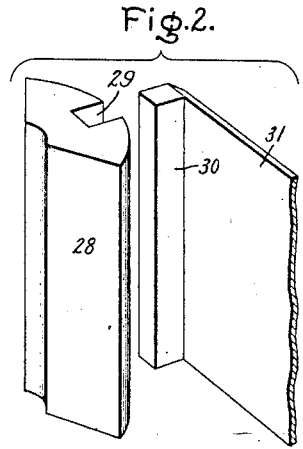
Figure 3:
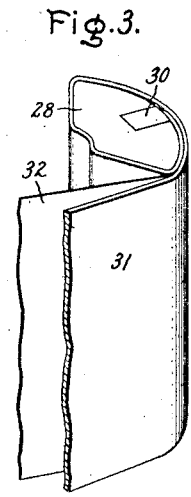
Figure 4:
Figure 5:
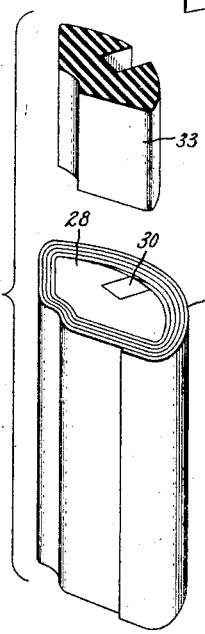
Figure 5:
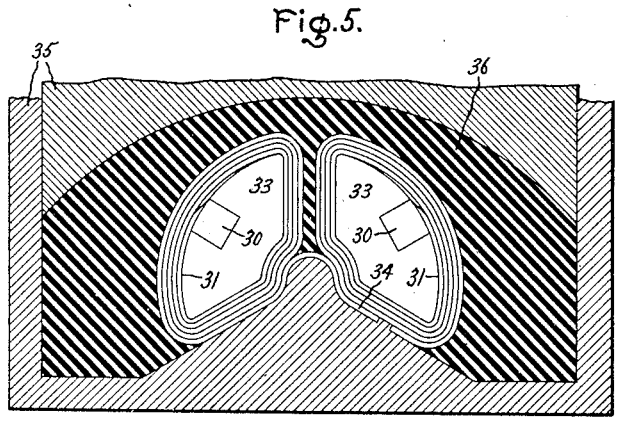
Figure 6:
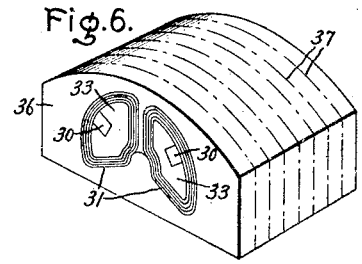

The features of my invention which are believed to be novel and patentable will be pointed out in the claims appended hereto. For a better understanding of my invention reference is made in the following description to the accompanying drawing in which Fig. 1 represents an exploded perspective view of an electrical measuring instrument having coils made in accordance with my invention; Figs. 2 and 3 represent initial steps employed in the method of winding of the coil on a metal form, Fig. 4 represents the step of replacing the metal form with insulation, Fig. 5 represents a mold and shows how two coils may be secured in fixed relation by a folded insulating compound supporting structure, and Fig. 6 shows a coil assembly as it comes from the mold preparatory to sawing it into a plurality of flat coil sections of the character shown in Fig. 1.

In Fig. 1 I have represented an electrical measuring instrument having a rotating element comprising the shaft 10, moving coil 11, pointer 12, damping vane 13 and balancing arms 14. Current may be conducted to the coil 11 by spirals 15 and 16 which may also furnish the required zero restoring torque. The instrument has four flat sector-shaped stationary coils 17, 18, 19 and 20 each formed of copper strip wound spirally. The coils 17 and 18 are held together in proper relation in the same plane by being molded in an insulation board 21 which serves also for the terminal supports and for mounting the coils in the instrument casing, not shown, as by means of bolts passing through openings 22. A similar insulating board 23 supports the lower stationary coils 19 and 20. The instrument is shown connected to a line 24 as an alternating current wattmeter. The moving coil 11 is connected across the line through spirals 15 and 16 and suitable insulated portions of shaft 10 and the stationary coils are connected in series to a current transformer 25 through internal coil terminals 26 and external coil terminals 27. The use of a wattmeter for showing the invention is illustrative only and the coils may be used wherever desirable or convenient in other kinds of instruments and devices. For clarity in illustration, Fig. 1 shows the stationary and moving coils separated vertically a much greater distance than would be the case in an actual instrument since ordinarily the coils will be assembled close together for maximum inductive relation consistent with practicable clearance between the stationary and moving coils. Coils 17 and 19 are in vertical alignment above and below the moving coil in its zero position and hence are connected to produce a flux in a vertical direction opposed to that of the moving coil and hence a repulsion torque. Coils 18 and 20 are located in vertical alignment opposite the up-scale position of the moving coil and are connected to produce a flux in the same vertical direction as the moving coil and hence an attraction torque. Hence as the watt load increases the moving coil moves from the zero position shown clockwise up-scale in accordance with the measurement.

Heretofore the formation of well insulated and ventilated coils of the shape shown and flat spirally wound coils of other shapes generally together with the necessary supporting and terminal structure has been expensive and unsatisfactory. The stationary coils carry considerable current and must be firmly held in place and should have an efficient cooling arrangement and strong adequate terminal facilities. The formation of such coils in accordance with my invention results in very satisfactory coils at low expense. The preferred method of forming such coils will now be described.

In Figs. 1, 2 and 3, 28 represents a metal form having an exterior shape corresponding to the desired internal shape of the coils to be formed and of any convenient length which may be many times the length of the thickness of the individual coils desired. This form has a longitudinal slot 29 for reception of a metal bar 30 which subsequently forms the internal terminals of the finished coils. The bar 30 of rectangular shape corresponding to the shape of slot 29 is brazed or otherwise firmly secured to the end of a metal strip 31 which subsequently forms the windings. In some cases the bar 30 may be formed by doubling over the end of the strip 31.

The bar 30 is then seated in the slot 29 of form 28 and the strip 31 wound thereon as illustrated in Fig. 3. I preferably use a form 28 made from metal since it must have strength to withstand the shocks which it receives during the winding operation where the strip 31 is of heavy gauge. For example, a hard copper strip 31 of 10 mils thickness needs to be pounded and pressed against the form or the equivalent to bend it around the form and make it conform to the contour of the form. Where a thin, easily bent strip is used, I may use a form made out of insulating material.

In winding the strip 31 on the form a sheet of insulation 32 such as good insulating paper, preferably coated or impregnated with an insulating cement, is also wound on between the spiral layers. This layer of insulation separates and insulates the consecutive spiral turns of the strip 31 and should be started before the first complete turn of strip 31 about the form. Although unnecessary it may be found convenient to start winding the insulation strip with the strip 31 since then I may insert the inner end of the strip 32 in the slot 29 when the bar 30 is inserted therein. This will serve to firmly hold the inner end of the insulation strip as the winding-on operation is started.

The amount of strip 31 and number of turns of the strip 31 which is thus wound on the form 28 is made to conform to the coil size and number of turns desired in the finished coil. The winding operation is, of course, accompanied with sufficient pressure, rolling, pounding and the like to bend the heavy strip tightly onto the form and give it a permanent bend to the shape of the form. The cement on or in the insulation strip assists in preventing the spiral of the coil opening up after the winding pressure is removed. I then have a strip wound on the form as illustrated in the lower portion of Fig. 4. I then take a bar of hard insulation 33 of the same or substantially the same size and shape as the form 28 and, using it as a driving plug, drive the form 28 out of the spiral coil and drive the plug of insulation 33 in its place. This operation merely replaces the metal form with insulation. As mentioned previously where a thin easily bent strip is used to form the spiral conductor layers, I may wind it directly upon a form made of insulating material such as the plug 33, but where the strip is sufficiently thick and stiff as to require considerable pressure during the winding and forming operation as would likely break or crush a form made of insulating material I then use the metal form and subsequently replace it with insulation.

The outer end of the spirally wound strip may be bent and extended in any desired fashion for the purpose for subsequently forming the external terminals of the coils. For example at 34 in Fig. 5 I have shown the outer end of the left-hand coil extended and bent to make easy connection with the outer end of the right-hand coil there shown. Other connections of this character are shown in Fig. 1.

The coil or coils thus formed are next provided with external supporting structure by molding insulation around them. For example, in making up two coil assemblies such as is shown in the upper and lower stationary coils of Fig. 1 I assemble long coils in the desired relative position in a mold 35, Fig. 5. The mold has an internal shape conforming to the external shape of the coil assembly desired and the mold is then filled with a powdered or plastic insulation 36 about the coils and pressure or heat or both are applied, depending upon the type of insulation and molding method used to set the insulation in hard block form with the coils embedded or partially embedded and molded therein.

In such molding operation the outer convolutions of the coils are pressed inwardly and hence are held firmly in place and shape when the insulation is converted into hard form. The molded insulation may be extended between the coils as shown or the coils may be separated merely by the previously mentioned paper insulation strip.

The structure thus formed is then removed from the mold and has the shape such as shown in Fig. 6. It is a strong, solid coherent body of rigid construction. I then employ a sharp circular saw and saw the block into strips of the desired thickness at right angles to the conductor therein as for example along the planes indicated by dotted lines 37, Fig. 6. I have found that a sharp saw will slice the block into coil assemblies such as represented for the stationary coils of Fig. 1 with a clean cut and without leaving projecting edges at the cut surfaces of the spiral conductors such as might otherwise cause short circuits between turns. The thickness of such coil assemblies for an instrument such as shown in Fig. 1 may be about ⅛ inch. In case a dull saw is used the sawed surfaces should be subsequently polished to remove any metal between the spiral conductors. Polishing may also be desirable for appearance. In assembling coils for molding into a coil assembly such as described attention should be taken in inserting the coils into the mold so as to obtain the desired direction of winding of the coils. For example, the right-hand spiral as assembled in Fig. 5 is wound counterclockwise from outside to inside. If the opposite direction had been desired the coil would have been inserted other end to.

It will be noted from Fig. 1 that the coils used were assembled slightly differently from that shown in Fig. 5 and that to obtain the different directions of winding shown for the upper and lower stationary coil assemblies of Fig. 1 from the same block the coil assembly board 23 is merely turned over with respect to board 22. The insulation designated 36 in Figs. 5 and 6 becomes the supporting boards 22 and 23 of Fig. 1. Supporting bolt holes and the like such as shown at 22 may be bored either before or subsequently to the sawing operation. Likewise, holes may be bored and threaded in the bar 30 which subsequently becomes the internal coil terminals either before or subsequently to the sawing operation. It is noted that the terminals are equally accessible from either side of the boards.

It is evident that the invention is applicable to the formation of flat spirally wound coils of any shape other than the sector shape shown and to the use of such coils or coil assemblies singly or in multiple with two or more coils assembled into a rigid structure.

The rigid block-like structure such as shown in Fig. 6 may be sold and shipped as an article of commerce and the customer may saw coils therefrom of the thickness desired. For example, if he wants a coil of a certain current carrying capacity he may saw a board from the block, say ⅛ inch thick and if he wants a coil of double such current carrying capacity he may saw a board therefrom ¼ inch thick, etc. Holes may be bored in the inner insulation part 33 as shown at 38 in Fig. 1 for various purposes. For example to make the structure lighter or for increased ventilation or for the insertion of holding screws or for the insertion of magnetic plugs to modify the flux distribution. Likewise, additional metal inserts or bars may be molded into either the inner or outer insulation structure for various purposes.

What I claim as new and desire to secure by Letters Patent of the United States, is:

1. The method of producing flat spirally wound electric coils and supporting structure therefor which consists in tightly rolling up sheets of conductor material and insulating material together such that the internal and external size and shape of the roll conforms to the desired internal and external size and shape of the coils, providing a tightly fitting core of insulating material within said roll, molding insulating material about said roll to partially imbed the roll therein and thereby forming a solid, rigid, block-like composite structure and sawing said composite structure into boards running at right angles to the axis of the roll therein and of a thickness conforming to the desired thickness of the coils.

2. The method of producing flat spirally wound electric coils and supporting structure therefor which consists in selecting a metal form of a shape and size conforming to the desired internal size and shape of the coils and of a length considerably longer than the desired thickness of the coils, wrapping a sheet of conductor material and a sheet of insulating material together several times about said form so that the insulating material lies between adjacent convolutions of the conductor material, forming said conductor material to the shape of the form as the wrapping proceeds, replacing said metal form with an insulator form of the same dimensions, inserting the roll thus formed in a mold, molding insulating material about the roll to partially imbed the roll therein and forming a solid, rigid-block-like composite structure and then sawing such block-like structure into boards running at right angles to the axis of the conductor roll therein, the boards being of a thickness corresponding to the desired thickness of the coils.

3. The method of forming coil assemblies consisting of a plurality of flat spirally wound coils lying in the same plane in fixed relation to each other which consists in preparing a plurality of rolls each consisting in rolling up a sheet of conductor material with an insulation sheet between the adjacent conductor convolutions of the rolls, providing tightly filling cores of insulating material within said rolls, inserting said rolls in a mold with their axes parallel and in the spaced relation desired, filling the mold about said rolls with insulating material and molding it in place to form a solid composite rigid block in which said rolls are partially imbedded and firmly held, and sawing said block into boards at right angles to the axis of said rolls, the boards being of a thickness corresponding to the desired thickness of the coil assemblies.

4. The method of forming several similar spirally wound flat electric coils which consists in selecting a metal form of a size and shape conforming to the desired internal size and shape of the coils and of a length several times the thickness of coils desired, forming a terminal slot lengthwise in the external surface of said form, selecting a winding terminal bar and a winding coil sheet of conductor material and a sheet of insulating material, said bar having a length and said sheets having a lateral dimension corresponding to the length of said form, securing said terminal bar to one edge of said conductor sheet and inserting said bar in the slot of said form to form internal coil terminal structure and anchoring said sheet to said form, wrapping said conductor, sheet and insulation sheet together spirally and several times about said form and shaping the conductor sheet to said form as wrapped, securing the external convolution of said spirally wrapped conductor in place by insulating material molded in place to form a solid composite block within which said spirally wound conductor is partially imbedded and then sawing the block into boards running at right angles to the conductor material therein to form flat spirally wound coils of the thickness of such boards.

THEODORE A. RICH.

CERTIFICATE OF CORRECTION.

Patent No. 2,334,584.  November 16, 1943.

THEODORE A. RICH.

It is hereby certified that error appears in the printed specification of the above numbered patent requiring correction as follows: Page 1, first column, line 23, for "folded" read --molded--; and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.